United States Patent
Hausmann et al.

[11] 3,797,239
[45] Mar. 19, 1974

[54] SUPERSONIC COMBUSTION ENGINE

[75] Inventors: George F. Hausmann, Glastonbury, Conn.; Arthur W. Blackman, Cambridge, Mass.

[73] Assignee: United Aircraft Corporation, East Hartford, Conn.

[22] Filed: Oct. 24, 1965

[21] Appl. No.: 504,706

[52] U.S. Cl. .................. 60/268, 60/224, 60/246, 60/39.43
[51] Int. Cl. .............................................. F02k 3/00
[58] Field of Search ............ 60/224, 246, 268, 269, 60/39.74; 253/39.1 B

[56] References Cited
UNITED STATES PATENTS

| 2,509,890 | 5/1950 | Stacker | 60/224 |
| 2,579,049 | 12/1951 | Price | 60/39.35 |
| 3,111,005 | 11/1963 | Howell et al. | 60/246 |
| 3,203,180 | 8/1965 | Price | 60/262 |
| 3,237,400 | 3/1966 | Kuhrt | 60/246 |

Primary Examiner—Samuel Feinberg
Attorney, Agent, or Firm—Donald F. Bradley

EXEMPLARY CLAIM

1. An airbreathing turbine-type powerplant comprising:

a supersonic convergent inlet having a throat in which air flows at supersonic velocity, a plurality of counterrotating supersonic impulse rotors located at the throat of said inlet whereby the air is accelerated and discharged at supersonic velocity means for driving said rotors, a plurality of supersonic straightening stators downstream of said rotors, means for injecting fuel into said supersonic airstream through said supersonic straightening stators, a fixed, annular supersonic diffuser downstream of said stators, and a combustion chamber downstream of said fuel injecting means for combusting said fuel-air mixture at supersonic velocities.

1 Claim, 8 Drawing Figures

PATENTED MAR 19 1974 3,797,239
SHEET 1 OF 2
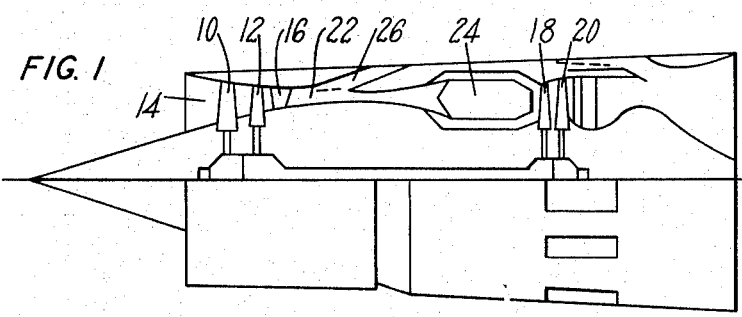
FIG. 1
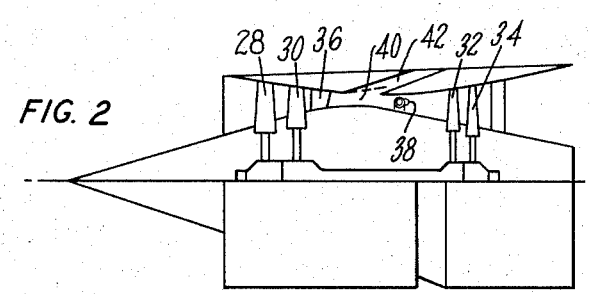
FIG. 2
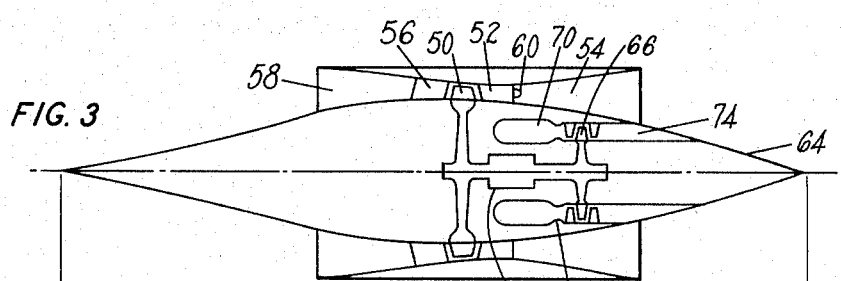
FIG. 3
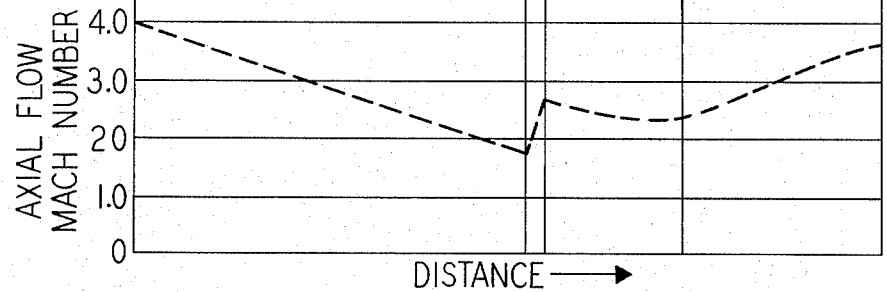
INVENTORS
GEORGE F. HAUSMANN
ARTHUR W. BLACKMAN
BY Donald J. Bradley
ATTORNEY

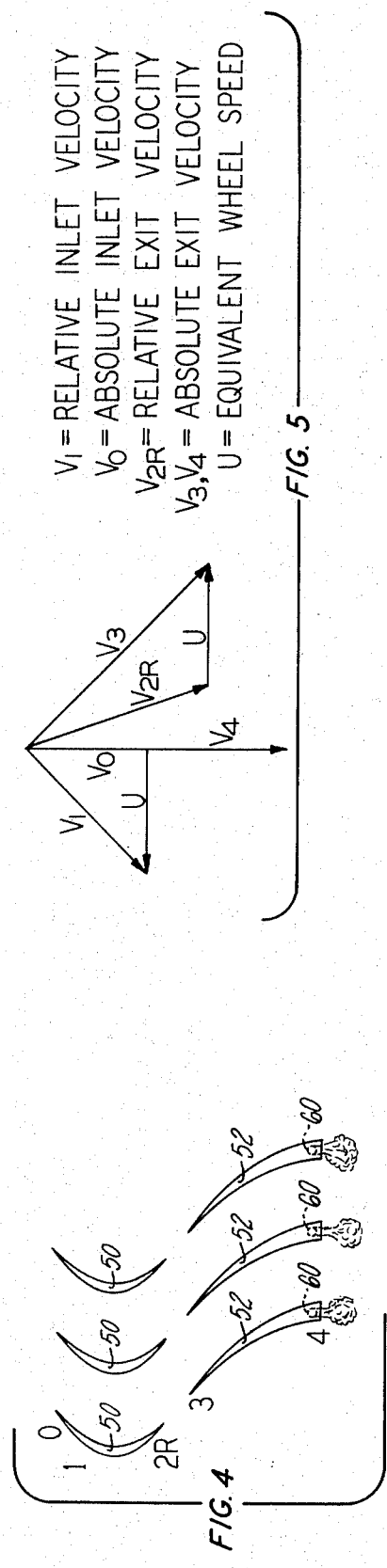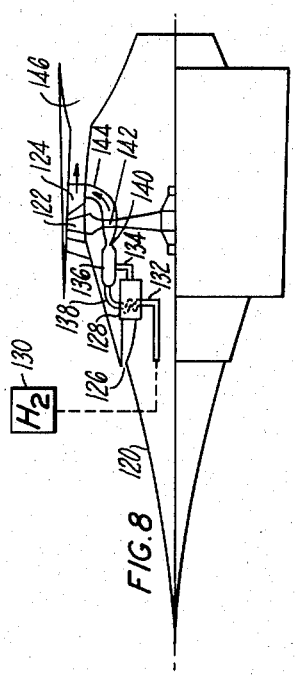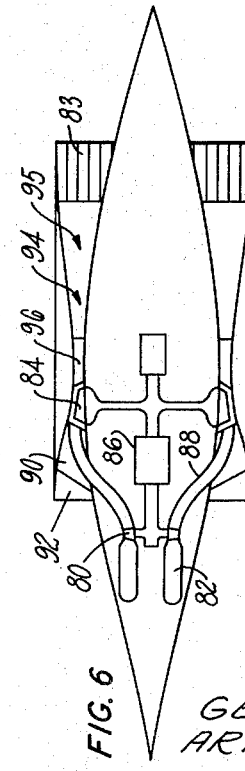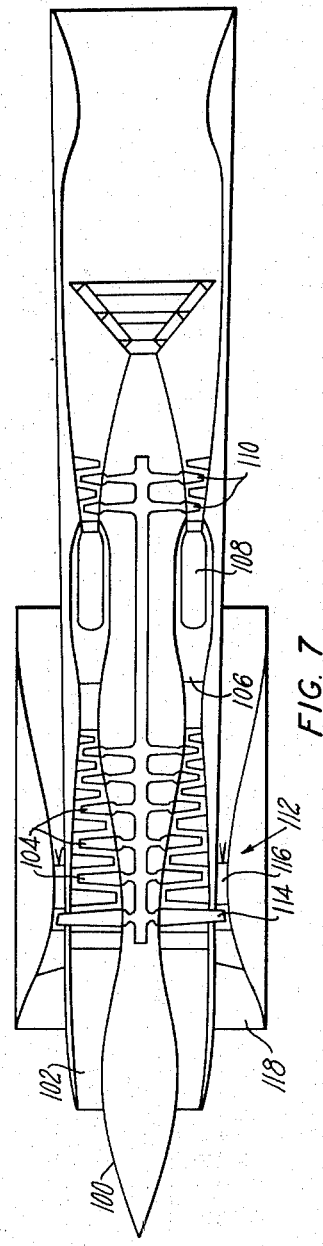

SUPERSONIC COMBUSTION ENGINE

This invention relates to turbine type engines, and specifically to improved lightweight turbine engines designed to accelerate through subsonic and supersonic flight speeds and cruise at supersonic speeds. More particularly the invention encompasses engines having a supersonic inlet, a supersonic impulse compressor located at the inlet throat, and a combustor operable at the supersonic Mach numbers provided by the impulse compressor.

At the present advanced state of the art of turbine engine components it is expected that only modest gains can be realized in component efficiencies, resulting in only slight improvement in aircraft range and payload for such higher component efficiencies. However, reductions in propulsion system weight will produce increases in aircraft range and/or payload by direct substitution of propulsion system weight savings for extra payload and/or fuel. This aspect of system design is particularly significant since at present engine weight is nearly equal to aircraft payload for supersonic aircraft. Further, present air induction systems are substantially equal to engine weight for flight in the vicinity of Mach 3, and as flight speeds increase the weight and complexity of efficient inlets increases. It is therefore obvious that large gains in the payload or range of supersonic aircraft will result if the propulsion system weight can be reduced by integrating the inlet, compressor and combustor components.

The use of supersonic compressors in turbo-type propulsion systems for flight at supersonic speeds offers the potential advantages of light weight because of the high work output per stage and design flexibility of the supersonic induction system which results from the ability of the supersonic compressor to accommodate supersonic axial Mach numbers. The primary disadvantage of conventional supersonic compressor systems of either the shock-in-rotor or shock-in-stator types is the relatively low efficiency which results from shock-boundary layer interactions, nonequilibrium radial flows, and secondary flows within the blading. These loss-producing mechanisms are all attributed to severe adverse pressure gradients within the blading.

As taught in U.S. Pat. No. 2,947,139, entitled "By-Pass Turbojet", issued Aug. 2, 1960, to George F. Hausmann and assigned to United Aircraft Corporation, the details of the patent teaching being hereby incorporated as part of this application, the supersonic impulse rotor imparts angular momentum and increased kinetic energy to the airflow with little or no increase in static pressure. The airflow is then redirected to the axial direction by either counterrotating rotor configurations or by impulse stators having little or no static pressure rise within the passages. For a conventional supersonic through-flow engine with subsonic combustion, an annular diffuser configuration is used to convert the resulting kinetic energy to static pressure and to reduce the flow Mach number to subsonic velocities. The diffuser may be provided with bleed passages or a variable geometry throat to accommodate matching requirements when applied to turbo-type propulsion systems. By utilizing the supersonic combustion teachings of this invention, the diffuser downstream of the compressor may be eliminated since there is no need to lower the Mach number below supersonic before the airflow from the compressor enters the combustion chamber.

The turbine engines described herein reduce the weight of the propulsion system by utilizing a supersonic inlet which only partially compresses the free stream supersonic flow, thus eliminating the need for a complex inlet for all flight regimes. A supersonic impulse compressor is located at the inlet throat and is designed to operate with a supersonic axial Mach number. Combustion downstream of the impulse compressor is effected supersonically, thus eliminating the need for a complete supersonic diffuser or stator to reduce the flow Mach number to subsonic values as required for conventional engines having subsonic Mach numbers.

It is therefore an object of this invention to provide a novel turbojet engine utilizing a coupled supersonic inlet, supersonic impulse compressor, supersonic combustor and supersonic turbine.

Another object of this invention is a propulsion system for supersonic speeds and high altitudes having lower weight than conventional propulsion systems.

A further object of this invention is a turborocket in which combustion takes place at supersonic velocities.

Another object of this invention is a turbine engine in which inlet weight and complexity are considerably reduced.

A still further object of this invention is a turborocket engine system in which the turbine is driven by exhaust products from a gas generator separate from the combusted air.

Another object of this invention is a novel air-liquefying turborocket utilizing supersonic compression and combustion.

A further object of this invention is a novel bypass supersonic combustion engine.

These and other objects and a fuller understanding of this invention may be had by referring to the following description and claims, read in conjunction with the accompanying drawings, in which:

FIG. 1 shows a conventional supersonic through-flow compressor subsonic combustion engine; and FIG. 2 shows a supersonic through-flow compressor turbojet engine with supersonic combustion and a supersonic turbine; and FIG. 3 shows a novel lightweight turborocket engine utilizing a supersonic impulse compressor and supersonic combustion together with Mach number variations through the turborocket; and FIG. 4 shows a preferred supersonic compressor blade configuration; and FIG. 5 shows typical vector diagrams of flow velocities through the supersonic through-flow compressor; and FIG. 6 shows an alternate turborocket configuration; and FIG. 7 shows a bypass engine configuration utilizing the supersonic impulse compressor, supersonic combustion concept; and FIG. 8 shows an air-liquefying air-turborocket.

A conventional supersonic turbojet engine employing a supersonic through-flow impulse compressor and subsonic combustion is shown in FIG. 1. Referring to the FIGURE, counterrotating supersonic impulse rotors 10 and 12 compress the airflow from diffuser 14 whereby the flow leaves the compressor supersonically with neglibible exit swirl. A supersonic straightening compressor stator 16 may be incorporated to return the flow from the compressor to the axial direction, depending on whether or not flow with tangential velocities in the combustor is desired.

The rotors 10 and 12 are driven conventionally by shafts which are in turn driven by turbine rotors 18 and 20. The second impulse rotor 12 is driven by the first stage turbine 18 and the first impulse rotor 10 is driven by the second stage turbine 20. The use of supersonic counterrotating impulse rotors provides an efficient means for accelerating the air without necessarily increasing the static pressure at this stage of the powerplant cycle.

Downstream from the compressor is an axisymmetric supersonic diffuser 22 for converting the flow kinetic energy to static pressure prior to entry into the burner 24. Bleed passages 26 having bleed doors or the equivalent are provided to permit the annular diffuser 22 to swallow the flow during starting and off-design operation.

The location of the compressor at the inlet capture station permits an appreciable reduction in overall engine length and complexity.

Although the configuration of FIG. 1 shows a counterrotating compressor with two shafts, a lighter design with somewhat reduced performance may be provided by the use of a single shaft with impulse stators located at the exit of each rotor.

If a supersonic through-flow turbojet and a conventional turbojet having a subsonic compressor are both designed to supply the same Mach 3 thrust, the frontal area of the supersonic through-flow engine would be approximately equal to that of the turbojet and each engine would pass the same airflow. However, transonically the supersonic through-flow engine passes 35 percent more relative weight flow than the conventional turbojet because of the larger flow area of the through-flow compressor. Thus during transonic acceleration the airflow of the supersonic through-flow engine would be approximately 35 percent greater than a conventional turbojet having the same Mach 3 thrust and approximately the same inlet diameter. As a consequence it is not necessary to employ afterburning to attain adequate takeoff or transonic acceleration thrust.

A modification of the supersonic through-flow compressor engine utilizing supersonic combustion is shown in FIG. 2. The comments noted above apply to this configuration also except as indicated. The supersonic combustion through-flow engine consists of counterrotating impulse compressor stages 28, 30 from which the flow leaves supersonically with negligible exit swirl, and which are driven by counterrotating turbine stages 32, 34. A supersonic straightening stator 36 may be incorporated. Fuel is injected through a multiplicity of nozzles 38 or through the straightening stators 36 into the exit flow from the compressor. Ignition is achieved by conventional piloting. The turbine blades are cooled by conventional film or transpiration cooling. Downstream from the compressor is an annular supersonic diffuser 40 which partially converts the flow kinetic energy to pressure and reduces the supersonic Mach number entering the burner. The diffuser 40 is shortened relative to the diffuser in a subsonic combustion engine, and the supersonic combustion in combination with a supersonic turbine results in a considerably shortened engine configuration. Flow may pass from the turbine into an afterburner (not shown) where additional fuel is injected through nozzles and the flow then exhausts through an exhaust nozzle. Bleed doors 42 or the equivalent may be provided to permit the annular diffuser 40 to swallow flow during starting and off-design operation.

To achieve efficient supersonic combustion, sufficient combustion chamber length must be provided to meet two basic requirements. First, there must be sufficient length to provide for the ignition delay time of the fuel-oxidizer mixture; second, the length must be compatible with the achieving of approximately flat transverse temperature distributions. The first length requirement is fixed by chemistry considerations, and the second requirement is fixed by fluid mechanical considerations. For a given fuel-oxidizer mixture and flight condition, the ignition length is an exponentially dependent function of the static temperature of the flow stream. Hence, the ignition distance can be kept short by providing piloting, low blockage flameholders, or upstream injection which raises the local static temperature. The mixing length can be kept short by providing a large number of transverse ignition sources, e.g., the mixing distance for two sources is approximately half the distance required for one source.

The best fuels for use with supersonic combustion engines are those which have the shortest ignition delay times, the highest density, and highest theoretical specific impulse. The choice of an optimum fuel for a specific application will depend upon the trade-offs involved since all fuels do not exhibit all of the desired characteristics. In most cases either hydrogen or hydrocarbon fuels will probably be preferred.

The requirements noted above relative to the combustion chamber and fuel are pertinent to the various supersonic engine configurations described herein. Background material relating to the theory of supersonic combustion in ramjets, and considerations of combustion and mixing requirements may be found by referring to articles in Astronautics and Aeronautics magazine entitled "Hypersonic Airbreathing Propulsion" by W. H. Avery and G. L. Dugger, June 1964 at page 42, and "Supersonic Combustion Progress" by A. Ferri, August 1964 at page 32.

Advantages of a supersonic impulse compressor, supersonic combustion and supersonic turbine engine are: lightweight, mechanical simplicity, short length, a reduced number of stages, high flow handling capacity during takeoff and transonic acceleration, minimized dissociation of the exhaust products in the combustion chamber, and reduced pressure and heat transfer in the combustion chamber.

FIG. 3 shows a novel light weight turborocket engine system utilizing a supersonic impulse compressor and supersonic combustion which is designed for cruise at supersonic speeds and extremely high altitudes. FIG. 4 shows a preferred compressor blade configuration, and FIG. 5 is a vector diagram showing flow velocities through the compressor blades. A representative illustration of flow Mach number variation through the engine is also shown in FIG. 3.

The primary features of this engine are a light weight supersonic impulse compressor located at the inlet throat, and a combustor operable at the supersonic Mach numbers provided by the impulse compressor. As shown in the FIGS. 3 and 4, the compressor consists of a plurality of highly curved blades 50. The blades preferably have a close spacing and an annulus contraction so designed that only kinetic energy is added to the fluid with high efficiency. The compressor has a series of supersonic straightening stators 52 to return the flow from the compressor to the axial direction. The compressor is located in the throat region of a pre-compression supersonic inlet 58 (FIG. 3) such that the compressor operates with a supersonic axial inlet Mach number.

Fuel to the supersonic combustor may be injected through support struts 56 upstream of the compressor, through injectors 60 mounted on the straightening stators 52 downstream from the compressor, or by conventional fuel injectors or nozzles in the combustor. A highly reactive fuel such as hydrogen either alone or in combination with other fuels and/or oxidizers, either cryogenic or storable, or a liquid slurry, would be used with this propulsion system. Combustion takes place with supersonic velocities, and the Mach number of the flow within the combustor decreases as the temperature is increased.

Referring to FIG. 3, air enters diffuser 58 and passes into the compressor 50. The air is compressed supersonically and leaves the compressor at a Mach number greater than unity as shown in the graph connected with FIG. 3. Fuel is injected into the airstream through injectors 60 on the trailing edge of the compressor stator 52 as seen also in FIG. 4. The Mach number of the airstream is then increased in a second diffuser passage 54. The flow is then expanded through a nozzle 64.

The compressor 50 is driven by turbine 66 through a gearbox 68. Turbine 66 is driven by the exhaust products from a gas generator 70 which are passed through nozzle 72. The gas is further expanded through nozzle 74.

Fuel-air mixtures which have low ignition delays will perform best in this engine. A possible combination is the use of a hydrogen-low mixture in the gas generator 70 and hydrogen-air mixtures in the outer diffuser 54. It is necessary to provide sufficient mixing length downstream of the supersonic compressor so that the residence time of the fuel-air mixture in the mixing section is equal to or greater than the ignition delay of the mixture;

FIG. 5 illustrates diagrammatically the flow through the single stage supersonic impulse rotor 50 and stator 52 by means of vectors wherein the subscripts refer to the reference numerals adjacent FIG. 4. At the design condition, the inlet axial velocity is shown by vector $V_o$, which may be subsonic or supersonic. The rotor speed, U, is combined with the inlet velocity $V_1$, which is essentially tangent to the upper surface of the rotor blade leading edge. Within the rotor 50 the flow is turned, without change in pressure or velocity, to an angle which provides an absolute exit velocity $V_3$ when the rotor speed U is subtracted from the relative blade exit velocity $V_{2R}$. In this process the velocity is increased to a high supersonic value with no change in static pressure. Stator 52 straightens the flow from the rotor to the axial direction.

The graph under FIG. 3 shows the Mach number variation within the engine of FIG. 3 when a supersonic diffusion flame is used.

FIG. 6 illustrates an alternative turborocket configuration. The general features of the engine are similar to the engine of FIG. 3. Referring to FIG. 6, the power for turbine 80 is supplied by the expansion of regeneratively heated high pressure fuel or fuel-rich mixtures such as pure hydrogen in gas generator 82. Heating of the fuel may be accomplished by passing the fuel from the fuel supply (not shown) through the wall of the engine adjacent the exhaust 83 before expanding the gas past turbine 80. Compressor 84 is driven by the turbine through gearbox 86.

After passing through the turbine 80, the fuel is fed through passage 88 and injected into the airstream through injectors (not shown) mounted on struts 90 located at the compressor inlet. Air enters diffuser 92 and passes through the supersonic impulse compressor 84, is converted to pressure in diffuser 94 and the fuel-air mixture is supersonically combusted by conventional combustors (not shown) at 95. Stator 96 may be included as described previously.

FIG. 7 illustrates the application of the supersonic compressor, supersonic combustion concept to a bypass engine configuration. The main engine assembly is similar to a conventional turbojet bypass engine configuration. Air is injected through inlet nozzle 100 and diffuser 102 and passes through a number of stages of supersonic impulse rotors 104. After passing through supersonic diffuser 106, the air is supersonically or subsonically combusted in burner 108. The combustion products drive turbine stages 110, which in turn drive compressor rotors 104. An exhaust nozzle is provided as shown and afterburning may be performed.

The novel feature in this configuration is in the bypass section 112 of the engine. The trip of compressor blade 114 extends into the bypass portion of the engine and is operated at supersonic Mach numbers. Fuel is injected through stator 116. The air entering diffuser 118 is compressed supersonically by rotor 114 and the fuel-air mixture is burned supersonically in the bypass airstream by conventional means (not shown) as discussed previously.

FIG. 8 shows an air-liquefier turbojet utilizing supersonic combustion. Air entering engine inlet 120 is divided into two portions. The main portion of the airstream, approximately 80 percent of the air, is passed through a single-stage supersonic impulse compressor 122 and impulse stator 124. The bleed portion of the air stream, approximately 20° of the air, enters passage 126 in inlet 120 where the air is passed through a heat exchanger 128. A source of liquid hydrogen 130 supplies the coolant through line 132 to the heat exchanger 128, and the air passing through the heat exchanger 128 is liquefied. The liquefied air is then pumped through line 134 into a rocket chamber 136, and the hydrogen from the heat exchanger 128 is also pumped to rocket chamber 136 through line 138. The liquid air and the liquid hydrogen react in rocket chamber 136, and the hydrogen-rich reaction products expand through a nozzle 140 to drive turbine 142. The reaction takes place at a relatively high pressure, 100 to 300 psi, and the reaction products include considerable $H_2$, some $N_2$ and $H_2O$.

After being expanded through turbine 142, the turbine being on the same rotor blade as compressor 122, the hydrogen-rich reaction products are passed through line 144 and injected supersonically into the supersonic main airstream downstream of compressor 122 through stator 124 which also acts as a fuel injector. Supersonic combustion by conventional means then occurs, and the combustion products are exhausted through a truncated exhaust nozzle 146.

Since an extremely low temperature coolant is required to liquefy the airstream, hydrocarbon fuels cannot be utilized with this engine, and liquid hydrogen is the preferred fuel.

It is obvious that a second stage counterrotating combined compressor-turbine rotor may be used with this engine as described in conjunction with previous embodiments. Likewise the turbine could be a separate rotor or series of rotor stages driven by the expansion products of the liquefied air-liquid hydrogen combustion, with the compressor being driven by the turbine and the hydrogen-rich turbine exhaust products injected downstream of the compressor. In either case the compressor could include two counterroating stages. Further, the pumps required for the liquid hydrogen and/or liquid air could be driven from the turbine-compressor shaft.

Although this invention has been described in its preferred embodiment, it will be obvious to those skilled in the art that various changes and modifications can be made in the structure and operation of this invention without departing from the scope of the invention as hereinafter claimed.

We claim:

1. An airbreathing turbine-type powerplant comprising:
    a supersonic convergent inlet having a throat in which air flows at supersonic velocity,
    a plurality of counterrotating supersonic impulse rotors located at the throat of said inlet whereby the air is accelerated and discharged at supersonic velocity
    means for driving said rotors,
    a plurality of supersonic straightening stators downstream of said rotors,
    means for injecting fuel into said supersonic airstream through said supersonic straightening stators,
    a fixed, annular supersonic diffuser downstream of said stators,
    and a combustion chamber downstream of said fuel injecting means for combusting said fuel-air mixture at supersonic velocities.

* * * * *